US011273578B2

(12) United States Patent
Meyer et al.

(10) Patent No.: US 11,273,578 B2
(45) Date of Patent: Mar. 15, 2022

(54) DEVICE AND METHOD FOR IMPREGNATING INDIVIDUAL FIBERS, INDIVIDUAL THREADS, OR INDIVIDUAL ROVINGS

(71) Applicant: BASF SE, Ludwigshafen am Rhein (DE)

(72) Inventors: Andre Meyer, Lemfoerde (DE); Andreas Emge, Lemfoerde (DE); Laura Feddrich, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 93 days.

(21) Appl. No.: 16/771,671

(22) PCT Filed: Dec. 12, 2018

(86) PCT No.: PCT/EP2018/084491
§ 371 (c)(1),
(2) Date: Jun. 10, 2020

(87) PCT Pub. No.: WO2019/115587
PCT Pub. Date: Jun. 20, 2019

(65) Prior Publication Data
US 2021/0069936 A1 Mar. 11, 2021

(30) Foreign Application Priority Data
Dec. 14, 2017 (EP) ..................... 17207290

(51) Int. Cl.
| | | |
|---|---|---|
| B29B 15/00 | (2006.01) | |
| B29C 53/00 | (2006.01) | |
| B29B 15/12 | (2006.01) | |
| B29B 15/14 | (2006.01) | |
| B29C 53/56 | (2006.01) | |
| B29K 105/08 | (2006.01) | |
| B29K 105/10 | (2006.01) | |

(52) U.S. Cl.
CPC ............ *B29B 15/122* (2013.01); *B29B 15/14* (2013.01); *B29C 53/56* (2013.01); *B29K 2105/0881* (2013.01); *B29K 2105/10* (2013.01)

(58) Field of Classification Search
CPC ......... B29B 15/00; B29B 15/10; B29B 15/12; B29B 15/122; B29B 15/14; B29C 53/00; B29C 53/50; B29C 53/56
See application file for complete search history.

(56) References Cited

U.S. PATENT DOCUMENTS

| | | | |
|---|---|---|---|
| 3,924,028 A | 12/1975 | Benson et al. | |
| 4,088,468 A | 5/1978 | Robertson | |
| 5,049,407 A | 9/1991 | Soszka et al. | |
| 5,232,499 A | 8/1993 | Hiroshi et al. | |
| 5,330,338 A * | 7/1994 | Nakata ..................... | D02G 1/02 118/420 |
| 5,352,392 A * | 10/1994 | Johnson .................. | B29C 70/20 264/412 |
| 5,499,911 A | 3/1996 | Nakata et al. | |
| 6,884,469 B1 * | 4/2005 | Moireau ................. | C03C 25/20 427/428.05 |

FOREIGN PATENT DOCUMENTS

| | | |
|---|---|---|
| DE | 4134070 A1 | 8/1992 |
| DE | 19757881 A1 | 7/1999 |
| EP | 0033298 A1 | 5/1981 |
| EP | 0358905 A1 | 3/1990 |
| EP | 0479564 A2 | 4/1992 |
| FR | 2 703 036 A | 9/1994 |
| WO | 8102008 A1 | 7/1991 |

OTHER PUBLICATIONS

International Search Report for corresponding PCT/EP2018/084491 dated Mar. 19, 2019, 2 pages.

* cited by examiner

*Primary Examiner* — Jacob T Minskey
*Assistant Examiner* — Matthew Hoover
(74) *Attorney, Agent, or Firm* — Armstrong Teasdale LLP

(57) ABSTRACT

Described herein is a device for impregnating individual fibers, individual threads, or individual rovings with a matrix material, including a porous material that is soaked with the matrix material, and a metering installation for metering matrix material into the porous material, where an installation by way of which the individual fiber to be impregnated, the individual thread to be impregnated, or the individual roving to be impregnated can be pressed against an end face of the porous material is included, or where the porous material is received in a sleeve and the individual fiber, the individual thread, or the individual roving can be guided through the porous material in the sleeve.

Also described herein is a method for producing a component from impregnated individual fibers, individual threads, or individual rovings.

13 Claims, 3 Drawing Sheets

DEVICE AND METHOD FOR IMPREGNATING INDIVIDUAL FIBERS, INDIVIDUAL THREADS, OR INDIVIDUAL ROVINGS

CROSS-REFERENCE TO RELATED APPLICATIONS

This application is a U.S. National Phase Application of PCT/EP2018/084491, filed Dec. 12, 2018, which claims the benefit of priority to European Patent Application No. 17207290.2, filed Dec. 14, 2017, the entire contents of which are hereby incorporated by reference herein.

The invention relates to a device for impregnating individual fibers, individual threads, or individual rovings with a matrix material. The invention furthermore relates to a method for producing components from impregnated individual fibers, individual threads, or individual rovings, wherein the individual fibers, individual threads, or individual rovings are impregnated in the device.

Components which are produced from impregnated individual fibers, individual threads, or individual rovings are, for example, wound hollow bodies from fiber-composite plastics. Such wound hollow bodies are, for example, masts for wind-power installations or else for sailing ships.

In the production of such components it is possible for in each case only one individual fiber, one individual thread, or one individual roving to be used, or alternatively for a plurality of individual fibers, individual threads, or individual rovings to be impregnated in parallel in separate devices and to be subsequently molded to form the component. An impregnation of individual fibers, individual threads, or individual rovings is in particular advantageous when many individual fibers emanating from different directions are deposited onto a die or in a tool. This relates in particular to continuous winding methods and weaving methods. In general, the individual fibers, the individual threads, or the individual rovings herein immediately after soaking are laid up in a die for the component or wound onto a winding mandrel in order for the component to be produced.

A device for impregnating an individual thread is known from FR-A 2 703 036. Here, the matrix material is directly drizzled onto the individual thread by way of a metering installation A further device for impregnating a thread is described in FR-A 2 703 036. The thread here is guided through a porous body to which a medium that is to be applied to the thread is fed by way of a pressurized line. The quantity fed herein corresponds to the quantity of medium that is applied to the thread.

A device by way of which a mixture is applied to plastics fibers is described in U.S. Pat. No. 6,884,469. The fibers here are impregnated with the aid of a roller over which the fibers are guided and onto which the mixture is applied. A similar device for coating fibers by means of a roller to which the matrix material is applied is also described in U.S. Pat. No. 5,049,407 or 6,884,469.

Further devices for impregnating a thread are also known from U.S. Pat. No. 5,330,338, 5,499,911, 4,088,468, 3,924,028 or WO-A 81/02008. Furthermore, DE-A 41 34 070 describes a device by way of which a wire is rendered so as to be capable of slippage in that lubricant is fed by way of a fiber that is wound around the wire.

However, it has been demonstrated that the methods known from the prior art do not enable individual fibers, individual threads, or individual rovings to be impregnated without dripping, in particular when the impregnation unit is to operate in a non-pressurized manner and in all spatial directions.

It is therefore an object of the present invention to provide a device for impregnating individual fibers, individual threads, or individual rovings which wets the individual fibers independently of the spatial direction and in a substantially non-pressurized manner with a suitable quantity of matrix material and herein operates without dripping.

It is a further object of the invention to provide a method for producing a component from impregnated individual fibers, individual threads, or individual rovings.

The object is achieved by a device for impregnating individual fibers, individual threads, or individual rovings with a matrix material, comprising a porous material that is soaked with the matrix material, and a metering installation for metering matrix material into the porous material, wherein an installation by way of which the individual fiber to be impregnated, the individual thread to be impregnated, or the individual roving to be impregnated can be pressed against an end face of the porous material is comprised, or wherein the porous material is received in a sleeve and the individual fiber, the individual thread, or the individual roving can be guided through the porous material in the sleeve, the porous material being an open-cell foam having a cell size of a mean diameter in the range from 70 to 250 µm.

In the context of the present invention, any structure which has a length that is a multiple of the diameter is understood to be an individual thread. A thread is usually constructed from a plurality of fibers which are twisted or spun. In the case of an individual roving, a multiplicity of fibers, threads, or filaments are disposed so as to be mutually parallel.

By using an open-cell foam having a cell size with a mean diameter in the range from 70 to 250 µm as a porous material it is possible for the matrix material to be metered such that the latter is only dispensed from the porous material as long as an individual fiber to be impregnated, an individual thread to be impregnated, or an individual roving to be impregnated is in contact with the porous material, the dispensing of matrix material from the porous material being terminated as soon as there is no contact between an individual fiber to be impregnated, an individual thread to be impregnated, or an individual roving to be impregnated and the porous material. This can be achieved, for example, by using a compressible porous material which can be compressed under pressure and restorers its initial shape as soon as the pressure acting on the porous material is interrupted. In this case, the porous material for impregnating the individual fiber, the individual thread, or the individual roving, is compressed in that region in which the individual fiber, the individual thread, or the individual roving is pressed against said porous material. Matrix material by way of which the individual fiber, the individual thread, or the individual roving can be impregnated is released by the compression of the porous material. In order for matrix material to be able to exit the porous material it is preferable for the porous material saturated with the matrix material at least in that region of the end face against which the individual fiber, the individual thread, or the individual roving is pressed. The volume is reduced as the individual fiber, the individual thread, or the individual roving is being pressed against the porous material and by way of the associated compression, and the matrix material exits the porous material. As soon as no more pressure is applied to the porous material, the porous material restores its original shape again, and no further matrix material exits.

Alternatively, matrix material can also be transferred by capillary forces from the porous material to the individual fiber to be impregnated, to the individual thread to be impregnated, or to the individual roving to be impregnated, by way of contact with the individual fiber to be impregnated, the individual thread to be impregnated, or the individual roving to be impregnated, and matrix material is replenished on account of the dispensing of matrix material by virtue of the capillary forces within the porous material. Also in this case, matrix material is dispensed from the porous material only when the latter is in contact with an individual fiber to be impregnated, an individual thread to be impregnated, or an individual roving to be impregnated.

In the embodiment in which the individual fiber to be impregnated, the individual thread to be impregnated, or the individual roving to be impregnated is pressed against an end face of the porous material, the porous material preferably has a length which is very much larger than the maximum length or width of the cross-sectional area. The end face against which the individual fiber to be impregnated, the individual thread to be impregnated, or the individual roving to be impregnated is pressed herein is the cross-sectional area at one end of the porous material. In order to enable transportation of the matrix material to the end face which is in contact with the individual fiber to be impregnated, the individual thread to be impregnated, or the individual roving to be impregnated, it is furthermore preferable for the porous material to permit a transportation of liquid along the length by way of capillary forces. The cross-sectional area of the porous material here-in can assume any arbitrary shape. It is preferable for the cross-sectional area to be circular, rectangular, or square.

In the embodiment in which the individual fiber to be impregnated, the individual thread to be impregnated, or the individual roving to be impregnated is pressed against the porous material, it is necessary for an installation by way of which the individual fiber to be impregnated, the individual thread to be impregnated, or the individual roving to be impregnated is pressed against the porous material to be provided. A suitable installation by way of which the individual fiber to be impregnated, the individual thread to be impregnated, or the individual roving to be impregnated can be pressed against the porous material comprises, for example, at least two tension rollers over which the individual fiber, the individual thread, or the individual roving is guided.

Alternatively or additionally to the tension rollers, it is also possible for an installation by way of which the individual fiber to be impregnated, the individual thread to be impregnated, or the individual roving to be impregnated can be pressed against the porous material to be provided, said installation comprising a bearing face on which the individual fiber, the individual thread, or the individual roving is guided.

A solid material is preferably provided for the bearing face such that it is possible for the porous material to be compressed while the individual fiber, the individual thread, or the individual roving is pressed against said porous material. Suitable materials for the bearing face can be plastics, metals, glass, or ceramics, for example. The material used has only to be inert in relation to the material of the individual fiber, of the individual thread, or of the individual roving and in relation to the matrix material used. The material for the bearing face should furthermore be resistant to abrasion so that there is no contamination of the individual fiber, of the individual thread, or of the individual roving by a braided material of the bearing face. It is preferable for the material for the bearing face to be a metal or glass. Stainless steel or aluminum are suitable as metals, for example. Ceramics or plastics that are resistant to abrasion can also be used for the bearing face. However, it is preferable for a bearing face from a metal or from glass to be used. "Resistant to abrasion", herein in the context of the present invention are understood to be materials in the case of which in the throughput of 1000 km of the individual fiber, of the individual thread, or of the individual roving, less than 0.1 mm is removed by the fibers running through.

In order for a sufficient impregnation of the individual fiber, of the individual thread, or of the individual roving to be obtained, it is preferable for the end face of the porous material against which the individual fiber to be impregnated, the individual thread to be impregnated, or the individual roving to be impregnated is pressed to have a maximum width and a maximum length which corresponds to at least the diameter of the individual fiber to be soaked, of the individual thread to be soaked, or of the individual roving to be soaked. In the case of a non-circular end face it is preferable for the maximum width of the end face to be in the range of 1.5 to 5 times the diameter of the individual fiber to be soaked, of the individual thread to be soaked, or of the individual roving to be soaked, and for the maximum length of the end face to be in the range of 2 to 10 times the diameter of the individual fiber to be soaked, of the individual thread to be soaked, or of the individual roving to be soaked. In this context, the extent of the end face of the porous material transversely to the running direction of the individual fiber to be soaked, of the individual thread to be soaked, or of the individual roving to be soaked, is understood to be the "width", and the extent parallel to the running direction of the individual fiber to be soaked, of the individual thread to be soaked, or of the individual roving to be soaked is understood to be the "length". In the case of a circular end face, the diameter of the end face is preferably in the range of 1.5 to 10 times the diameter of the individual fiber to be soaked, of the individual thread to be soaked, or of the individual roving to be soaked.

When the individual fiber, the individual thread, or the individual roving is pressed against the porous material by way of a bearing face, the area of the bearing face is preferably at least the size of the end face of the porous material such that the entire end face of the porous material bears on the bearing face in the case of contact between the bearing face and the end face of the porous material.

Apart from a solid bearing face on which the individual fiber, the individual thread, or the individual roving is guided and by way of which the individual fiber, the individual thread, or the individual roving is pressed against the porous material, it is also possible for the bearing face on which the individual fiber, the individual thread, or the individual roaming is guided to be an end face of the second porous material. The second porous material in one embodiment is likewise soaked with matrix material. In this case, it is possible for a material that is different from the first porous material to be used for the second porous material; however, the use of the same material for the first and for the second porous material is preferable. It is also possible for different components to be fed by way of the first and by way of the second porous material, for example a first component of a bi-component system by way of the first porous material and a second component of the bi-component system by way of the second porous material. The mixing in this instance is performed directly on the individual fiber to be impregnated, on the individual thread to be impregnated, or on the individual roving to be impregnated during the throughput.

However, it is preferable for the same matrix material to be fed by way of the first porous material and of the second porous material.

A further potential use of a second porous material lies in using the second porous material for receiving and evacuating excess matrix material that is released by the pressure of the first porous material acting against the second porous material. On account thereof, the excess matrix material that exits the first porous material can be removed in a targeted manner. The matrix material received by the second porous material can then be removed from the second porous material in a targeted manner by squeezing, for example.

When the porous material is received in a sleeve and the individual fiber to be impregnated, the individual thread to be impregnated, or the individual roving to be impregnated is guided through the sleeve, that much matrix material is preferably metered into the porous material such that the latter is oversaturated and the matrix material dispenses the matrix material to the individual fiber to be impregnated, to the individual thread to be impregnated, or to the individual roving to be impregnated without any pressurization.

In order for the threading of the individual fiber, of the individual thread, or of the individual roving into the sleeve to be facilitated, it is advantageous for the sleeve in which the porous material is received to be embodied in two parts and to be able to be opened for threading the individual fiber, the individual thread, or the individual roving, wherein each part of the sleeve contains porous material. The two parts of the sleeve herein can either be completely separated from one another and following the threading of the individual fiber, of the individual thread, or of the individual roving be connected to one another by way of suitable fastening means, or a hinge by way of which the two parts are connected such that the two parts of the sleeve for threading the individual fiber, the individual thread, or the individual roving can be folded open is alternatively provided. The two parts are folded shut and closed following the threading of the individual fiber, the individual thread, or the individual roving.

All closures for connecting the parts that are known to a person skilled in the art can be used both in the case of two separate parts for the sleeve as well as in the embodiment having a hinge. Suitable closures of fastening means are, for example, snap-fit closures, brackets, hooks, or else screws. It is important that the connection for closing the two parts is releasable so as to be able to thread a new individual fiber, a new individual thread, or a new individual roving, for example, in the case of a thread breakage or after the throughput of a fiber end.

Any material by way of which a transfer of the matrix material to the individual fiber, to the individual thread, or to the individual roving is enabled and which can be molded to form an open-cell foam having a cell size having a mean diameter in the range from 70 to 250 μm is suitable as the porous material which is soaked with the matrix material. In order to prevent any reaction with the matrix material, it is furthermore advantageous for the porous material to be inert in relation to the matrix material. The porous material is particularly preferably a foam which is composed substantially only of cell webs. "Composed substantially only of cell webs" in the context of the present invention means that more than 90% of the foam, preferably more than 95% of the foam, and in particular more than 98% of the foam has exclusively cell webs and no cell walls.

Suitable materials from which the porous material can be produced are all materials that do not react with the matrix material. These can be plastics, metals, glass, or ceramics, for example. Suitable plastics are selected in particular from polyolefins, in particular polyethylene or polypropylene, polyurethane, or melamine resins, and suitable metals are sintered metals, for example. Open-cell polymer foams from polyurethane or melamine resins are particularly preferable as the porous material.

In particular when the matrix material is to exit the porous material by virtue of the pressure by the individual fiber, by the individual thread, or by the individual roving, and no more matrix material is to be released once the pressure ends, it is advantageous for an elastic open-cell polymer foam which restores its original shape after the pressure ends is used.

In order to be able to continuously impregnate also very long individual fibers, individual threads, or individual rovings, it is necessary for sufficient matrix material to be provided. However, in order for the latter to exit the porous material only when the latter is in contact with the individual fiber to be impregnated, with the individual thread to be impregnated, or with the individual roving to be impregnated, the porous material must not be oversaturated with the matrix material. Saturation is achieved when the porous material can no longer receive any further matrix material without matrix material being dispensed at an arbitrary location by way of the surface. This requires that matrix material can be re-metered into the porous material during the impregnation of an individual fiber, of an individual thread, or of an individual roving. To this end, the porous material is preferably connected to a storage container in which the matrix material is located. The matrix material can then be fed to the porous material by way of a suitable metering installation, for example a metering pump. Alternatively, it is also possible for the matrix material to be allowed to simply continue flowing, for example under the influence of gravity. To this end, a buffer container can be used above the porous material for example, said buffer container being filled with the matrix material up to a predefined filling level. On account thereof, the hydrostatic pressure at which the matrix material is transported into the porous material is kept largely constant. It is furthermore also possible for the connection from the storage container in which the matrix material is located to the porous material to be filled with a further porous material such that the matrix material is directed through the connection line into the porous material by way of capillary forces.

In the use of the sleeve in which the porous material is received, the matrix material is preferably fed either with the aid of a metering installation or else under the influence of gravity from the storage container into the porous material in the sleeve.

In order for a defined fiber content by volume to be set, it is furthermore possible for a nozzle or an aperture plate to be additionally provided, the diameter of said nozzle or aperture plate being chosen such that excess matrix material is wiped off at the nozzle or at the aperture plate. On account thereof, a substantially constant fiber content by volume of the individual thread, of the individual fiber, or of the individual roving is set. When the porous material is received in a sleeve, there is the potential here for designing the opening at the exit of the individual thread, of the individual fiber, or of the individual roving from the sleeve so as to have a corresponding diameter such that the excess matrix material is already wiped off within the sleeve and can be returned into the porous material. Alternatively, however, it is also possible for a separate nozzle or an aperture plate to be provided behind the sleeve in the running direction of the individual fiber, of the individual thread, or of the individual roving. In particular when dissimilar fiber contents by volume are to be set, it can be advantageous for an adjustable aperture plate to be used, since the latter can then be set to the fiber content by volume desired in each case.

The further object is achieved by a method for producing components from impregnated individual fibers, individual threads, or individual rovings, comprising the following steps:

(a) Impregnating an individual fiber, an individual thread, or an individual roving with a matrix material in a device as has been described above;
(b) laying the soaked individual fibers, individual threads, or individual rovings onto the surface of a molding tool for molding the component; and
(c) curing or solidifying the matrix material and removing the component.

The molding tool for producing the component can be any arbitrary molding tool which is suitable for producing molded parts from fiber-reinforced polymers. Depending on the shape of the component to be produced, the molding tool can be embodied so as to be integral or to be in multiple parts, and can be an opened molding tool or else a molding tool to be closed. A molding tool to be closed is always used when the impregnated individual fibers, individual threads, or individual rovings that are laid onto the surface of the molding tool have to be pressed into a specific shape. Opened molding tools are in particular such molding tools onto which the impregnated individual fibers, individual threads, or individual rovings for producing the molded part can be wound, or else such molding tools in which the impregnated individual fibers, individual threads, or individual rovings are laid onto a convex surface such that the impregnated individual fibers, individual threads, or individual rovings even in the case of potential tension in laying bear completely on the surface and assume the shape of the molding tool.

The molding tool in one particularly preferred embodiment is a winding mandrel onto which the individual fiber, the individual thread, or the individual roving for producing a hollow body is wound.

Such a hollow body can be a mast, for example, such is used for a wind-power installation or else on a sailing ship or sailing boat. Further hollow bodies which can be produced by winding onto a winding mandrel are, for example, yards for sailing ships, pipes, or arbitrary other endless profiles which do not have any concave regions or recesses, since it is not possible for the impregnated individual fiber, the impregnated individual thread, or the impregnated individual roving to be pressed into such a recess or concave region during winding.

In order for the component to be produced, it is possible for in each case only one individual fiber, one individual thread, or one individual roving to be impregnated and to be laid onto the surface of the molding tool. However, in particular in the case of large components to be produced, it is advantageous for not only one individual fiber, one individual thread, or one individual roving to be processed but for a plurality of individual fibers, individual threads, or individual rovings to be processed simultaneously. The time required for laying the individual fibers, individual threads, or individual rovings onto the surface of the molding tool can be reduced by the simultaneous processing of a plurality of individual fibers, individual threads, or individual rovings. When a plurality of individual fibers, individual threads, or individual rovings are simultaneously processed, each of the individual fibers, individual threads, or individual rovings is impregnated in a device as has been described above, and the thus impregnated individual fibers, individual threads, or individual rovings are subsequently laid onto the surface of the molding tool in order for the component to be molded.

After laying the impregnated individual fibers, individual threads, or individual rovings onto the surface of the molding tool, curing or solidifying the matrix material is then performed in order for the component to be completed. Curing herein is usually performed when the matrix material still reacts chemically, for example in the case of multi-component systems such as used in particular for the production of thermosetting plastics, or else in the case of single-component systems in which the individual fiber, the individual thread, or the individual roving is impregnated with a monomeric or an oligomer which after impregnation reacts to form a polymer. Depending on the polymer to be produced and on the source materials depending thereon, the reaction can be started, for example, by adding initiators or activators and/or also by an energy input, for example by heat, light, or UV radiation.

When the matrix material is a plastic melt, typically a thermoplastic material, no further chemical reaction is performed, but the plastic is solidified by cooling on account of which the completely molded component is created.

However, the method according to the invention is particularly preferably used in the case of systems in which the matrix material reacts to form the polymer only after impregnation.

Exemplary embodiments of the invention are illustrated in the figures and will be explained in more detail in the description hereunder.

Figure 1:
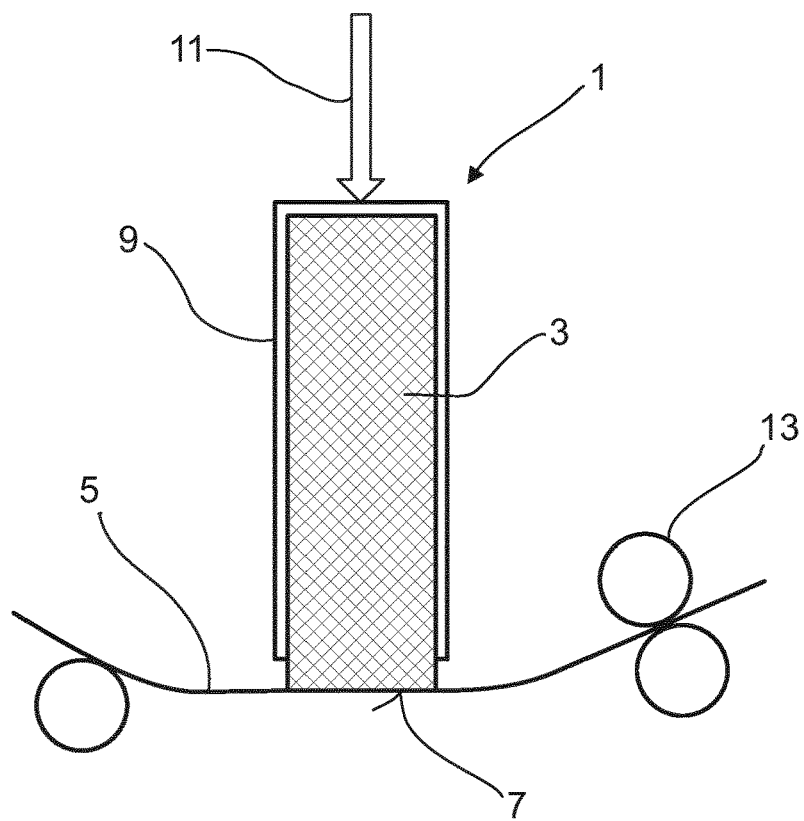
FIG. 1 shows a device for impregnating individual fibers, individual threads, or individual rovings, in a first embodiment.

A device for impregnating individual fibers, individual threads, or individual rovings is illustrated in a first embodiment in FIG. 1.

A device 1 for impregnating individual fibers, individual threads, or individual rovings comprises a porous material 3 which is soaked with a matrix material. For impregnating, an individual fiber 5, an individual thread, or an individual roving is pressed against an end face 7 of the porous material. Matrix material is transferred from the porous material 3 by the pressure of the individual fiber 5, of the individual thread, or of the individual roving on the end face 7 to the individual fiber 5, to the individual thread, or to the individual roving such that the individual fiber 5, the individual thread, or the individual roving is impregnated with the matrix material.

The porous material 3 for improved handling is preferably received in a mounting 9 as is schematically illustrated here. The mounting 9 can be made from any arbitrary material, preferably from a metal.

In particular for impregnating in a continuous method, it is necessary for matrix material to be fed regularly or continuously to the porous material 3. In the case of a regular addition, it is possible, for example, for the content of matrix material in the porous material to be measured and for matrix material to be re-supplied when a predefined limit is undershot. The content of matrix material can be performed, for example, by measuring the mass of the porous material. In the case of a continuous addition of matrix material, a metering pump by way of which matrix material is fed at the same rate as is dispensed to the individual fiber to be impregnated, to the individual thread to be impregnated, or to the individual roving to be impregnated, is preferably used, such that the proportion of matrix material in the porous material remains constant. The addition of the matrix material to the porous material here is schematically illustrated by an arrow 11. Alternatively, it is also possible for a buffer container having a predefined filling quantity to be provided, said buffer container being disposed above the porous material. Matrix material can then be replenished by the influence of gravity from the storage container to the porous material by way of a connection line. The predefined filling quantity in the buffer container allows the hydrostatic pressure to be set such that it is guaranteed on account thereof also that sufficient matrix material is always contained in the porous material.

Various methods can be used for pressing the individual fiber to be impregnated, the individual thread to be impregnated, or the individual roving to be impregnated against the porous material. Three different variants by way of which the individual fiber, the individual thread, or the individual roving can be pressed against the porous material are shown herein in FIGS. 1, 2, and 3.

It is thus possible for tension rollers 13 to be provided, for example, as is illustrated in FIG. 1, in order for the individual fiber 5 to be impregnated, the individual thread to be impregnated, or the individual roving to be pressed against the end face 7 of the porous material 3. The tension rollers to this end are disposed such that the individual fiber 5 to be impregnated, the individual thread to be impregnated, or the individual roving to be impregnated is pressed against the end face 7 of the porous material 3. The necessary pressure can be achieved in that in each case roller pairs are used as tension rollers 13, wherein the individual fiber 5, the individual thread, or the individual roving is guided through between the roller pairs. A tension can then be applied to the individual fiber 5, to the individual thread, or to the individual roving by dissimilar rotational speed of the roller pairs, such that said individual fiber 5, said individual thread, or said individual roving is pressed against the end face 7 of the porous material.

Figure 2:
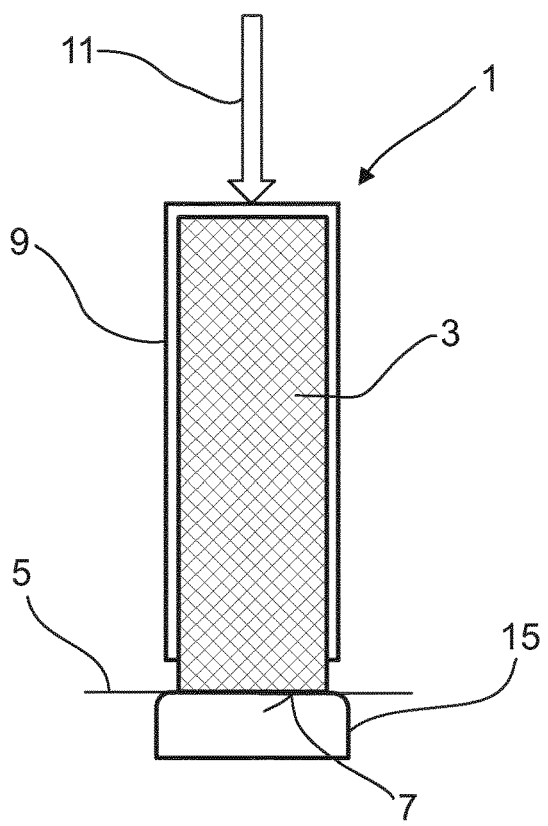
FIG. 2 shows a device for impregnating individual fibers, individual threads, or individual rovings, having a bearing face on which the individual fiber to be impregnated, the individual thread to be impregnated, or the individual roving to be impregnated is guided.

An alternative embodiment for the installation for pressing the individual fiber 5, the individual thread, or the individual roving against the end face 7 of the porous material 3 is illustrated in FIG. 2. The installation by way of which the individual fiber 5 to be impregnated, the individual thread to be impregnated, or the individual roving to be impregnated, is pressed against the end face 7 of the porous material 3 here comprises a bearing face 15 on which the individual fiber 5, the individual thread, or the individual roving is guided. The individual fiber 5, the individual thread, or the individual roving is pressed against the end face 7 of the porous material 3 by way of the bearing face 15. Any arbitrary non-compressible material known to a person skilled in the art can be used as the material for the bearing face 15. It is preferable for the material to have a smooth surface such that no matrix material can invade the material of the bearing face 15. Therefore, metals or glass in particular are suitable materials.

Figure 3:
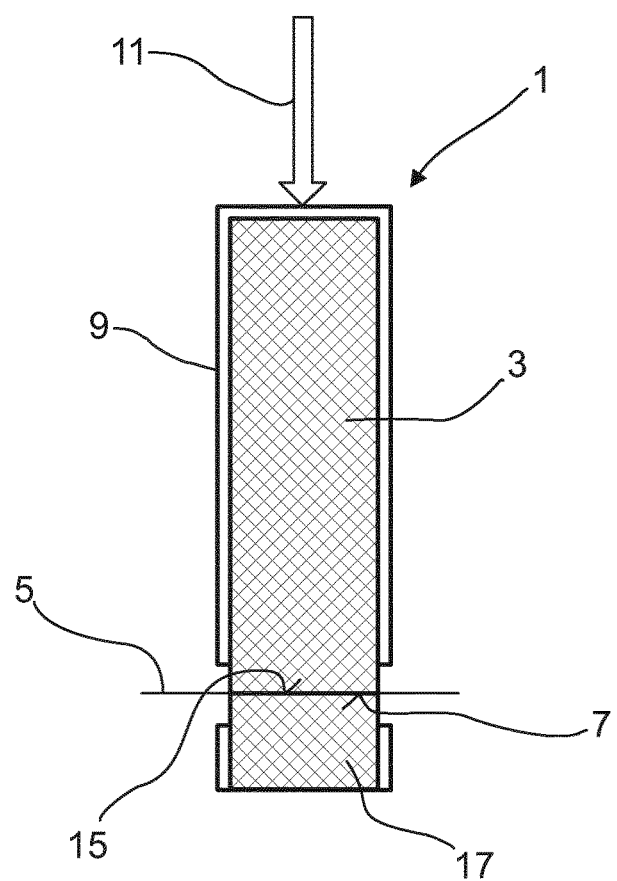
FIG. 3 shows a device for impregnating individual fibers, individual threads, or individual rovings, in which the bearing face on which the individual fiber to be impregnated, the individual thread to be impregnated, or the individual roving to be impregnated is guided is a bearing area of a second porous material.

A further alternative is illustrated in FIG. 3. A second porous material 17 is used here as the bearing face 15. The second porous material 17 herein is preferably likewise soaked with the matrix material such that the individual fiber 5, the individual thread, or the individual roving can receive matrix material from the first porous material 3 and from the second porous material 17. However, it is also possible for the second porous material 17 to not be soaked with the matrix material. In this case, the second porous material 17 can receive excess matrix material which has been dispensed by the first porous material 3 but has not been received by the individual fiber 5, by the individual thread, or by the individual roving, such that said excess matrix material does not drip and lead to contamination. As soon as the second porous material has been saturated with the excess matrix material received, it is possible, for example, for the second porous material 17 to be squeezed in order for the matrix material to be recovered. Alternatively, it is also possible for the second porous material 17 to then be used as the porous material 3 saturated with the matrix material so as to impregnate the individual fiber 5, the individual thread, or the individual roving, and for a new porous material to be provided as the second porous material 17, by way of which the individual fiber 5, the individual thread, or the individual roving is pressed against the end face 7 of the porous material 3.

Alternatively, however, it is also possible for the entire construction to be rotated such that the end face 7 of the porous material 3 can point in any other arbitrary direction. It is in each case to be noted herein that, apart from the porous material 3, the installation by way of which the individual fiber 5, the individual thread, or the individual roving is pressed against the end face is also aligned in a corresponding manner such that the individual fiber 5, the individual thread, or the individual roving can be pressed against the end face 7 of the porous material 3.

An alternative embodiment of the device for impregnating individual fibers, individual threads, or individual rovings is illustrated in FIGS. 4 to 7.

Figure 4:
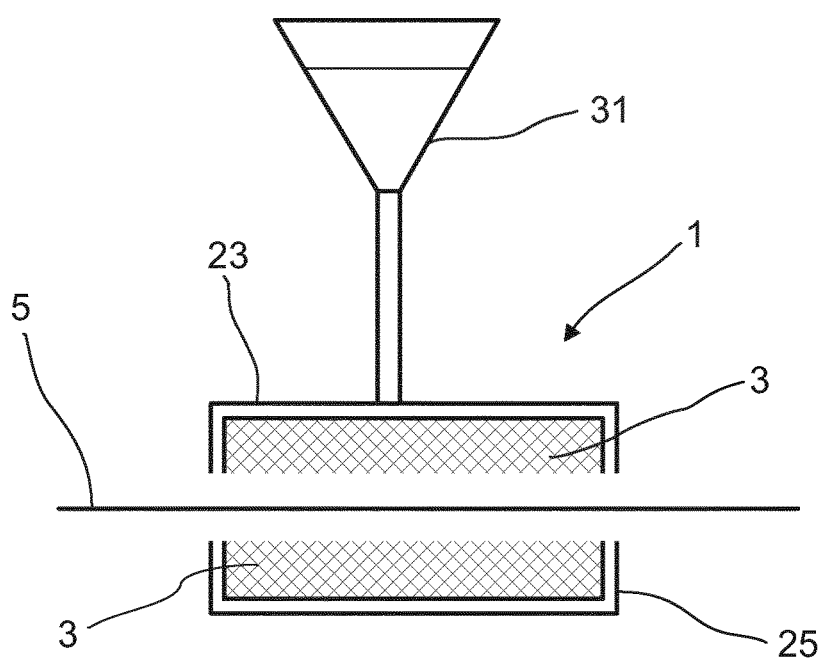
FIG. 4 shows a device for impregnating individual fibers, individual threads, or individual rovings, in which the porous material is received in a sleeve, in the opened state.
Figure 5:
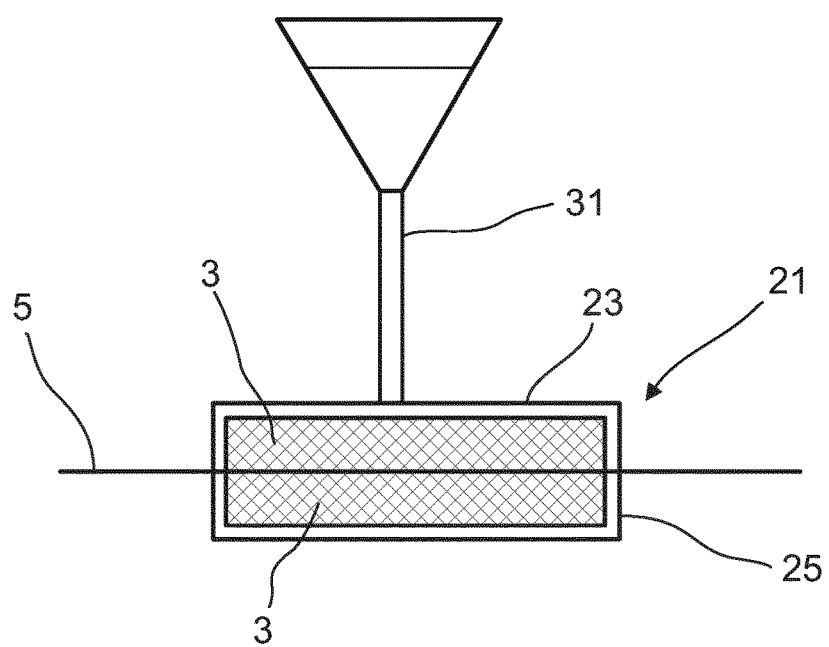
FIG. 5 shows the device illustrated in FIG. 4 in the closed state.
Figure 6:
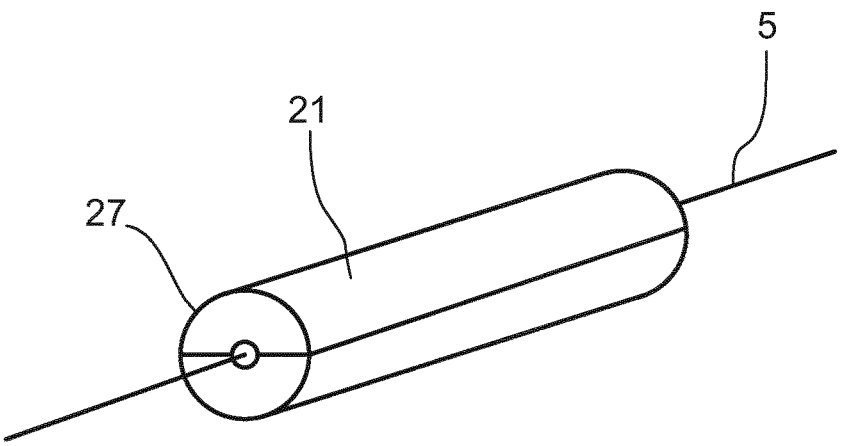
FIG. 6 shows a three-dimensional illustration of a device for impregnating individual fibers, individual threads, or individual rovings, in which the porous material is received in a sleeve through which the individual fiber to be impregnated, the individual thread to be impregnated, or the individual roving to be impregnated is guided.
Figure 7:
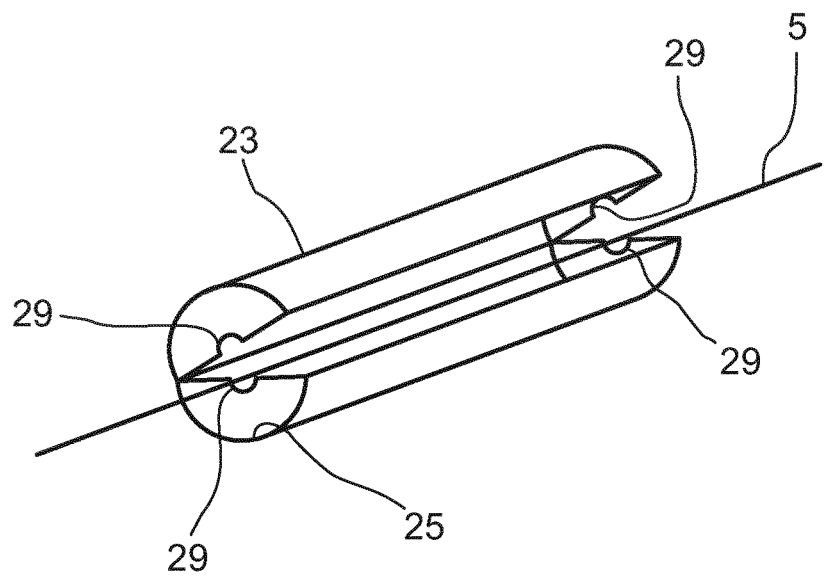
FIG. 7 shows the device illustrated in FIG. 6 in the opened state.

FIGS. 5 and 6 here show the device for impregnating an individual fiber 5, an individual thread, or an individual roving in the closed state, and FIGS. 4 and 7 show the device in the opened state.

The porous material 3 in the embodiment illustrated in FIGS. 4 and 5 is received in a sleeve 7. The individual fiber 5, the individual thread, or the individual roving for impregnation is guided through the porous material in the sleeve 21, said porous material being soaked with the matrix material.

In order for the individual fiber 5, the individual thread, or the individual roving to be able to be threaded into the sleeve, it is advantageous for the sleeve 21 to be embodied in two parts, having an upper part 23 and a lower part 25. Porous material 3 herein is received in each case in the upper part 23 and in the lower part 25. In order for the individual fiber 5, the individual thread, or the individual roving to be threaded, the upper part 23 and the lower part 25 are opened, the individual fiber 5, the individual thread, or the individual roving is placed onto the porous material 3 of the lower part 25, and the upper part 23 is subsequently connected to the lower part 25, and the sleeve 21 is thus closed.

The feeding of the matrix material is performed by way of a metering installation 31 wherein an inlet by way of a filling port can be used here, such as is illustrated in FIGS. 4 and 5. Alternatively, it is also possible for a metering pump or a comparable metering unit for feeding the matrix material to be used, as has already been described above in the context of the embodiment of FIGS. 1 to 3.

A construction in two parts, having a sleeve 21, is illustrated in a three-dimensional manner in FIGS. 6 and 7. FIG. 6 shows the construction in a closed state, and FIG. 7 shows the construction in closed state.

In order for the individual fiber 5, the individual thread, or the individual roving to be guided through the sleeve, a passage 27 through which the individual fiber 5, the individual thread, or the individual roving is guided is configured on the end sides of the sleeve 21. In the case of a construction of the sleeve 21 in two parts, as is illustrated here, a clearance 29 which in the case of a closed sleeve 21 forms the passage 27 is configured to this end preferably in each case in the upper part 23 and in the lower part 25.

The upper part 23 and the lower part 25 can be mutually separate parts, as is illustrated in FIG. 5, or alternatively be connected to one another by way of a hinge 27 on one side, as is illustrated in FIG. 7, such that the sleeve 21 is unfolded for opening.

Any arbitrary closing installation known to a person skilled in the art can be used for connecting the upper part 23 and the lower part 25 to one another. The upper part 23 and the lower part 25 can thus be connected to one another, for example, with hooks or else with closing brackets, or with a tension closure having a tension bracket. Alternatively, it is also possible for the upper part and the lower part to be screw-fitted to one another. However, a closing installation which can be rapidly opened, as is the case with hooks or closing brackets, or a tension closure having a tension bracket, respectively, is preferable.

In the case of a shape divided in two parts, it is necessary for the upper part 23 and the lower part 25 to be connected to one another on two sides. By contrast, in the case of the embodiment having a hinge, it is sufficient for a closing device to be provided on that side that is opposite the hinge.

The invention claimed is:

1. A device for impregnating individual fibers (5), individual threads, or individual rovings with a matrix material, comprising a porous material (3) that is soaked with the matrix material, and a metering installation for metering matrix material into the porous material (3), wherein an installation by way of which the individual fiber (5) to be impregnated, the individual thread to be impregnated, or the individual roving to be impregnated can be pressed against an end face (7) of the porous material (3) is comprised, or wherein the porous material (3) is received in a sleeve (21) and the individual fiber (5), the individual thread, or the individual roving can be guided through the porous material (3) in the sleeve (21), the porous material being an open-cell foam having a cell size of a mean diameter in the range from 70 to 250 µm.

2. The device as claimed in claim 1, wherein the porous material (3) is inert in relation to the matrix material.

3. The device as claimed in claim 1, wherein the porous material (3) is an open-cell foam which is composed substantially of cell webs.

4. The device as claimed in claim 1, wherein the porous material is produced from a material selected from the group consisting of polyolefin, polyurethane, and melamine resin.

5. The device as claimed in claim 1, wherein the installation by way of which the individual fiber (5) to be impregnated, the individual thread to be impregnated, or the individual roving to be impregnated can be pressed against the porous material comprises at least two tension rollers (13) over which the individual fiber (5), the individual thread, or the individual roving is guided.

6. The device as claimed in claim 1, wherein the installation by way of which the individual thread (5) to be impregnated, the individual thread to be impregnated, or the individual roving to be impregnated can be pressed against the porous material (3) comprises a bearing face (15) on which the individual fiber (5), the individual thread, or the individual roving is guided.

7. The device as claimed in claim 1, wherein the porous material (3) against which the individual fiber (5), the individual thread, or the individual roving is pressed has an end face (7), the end face having a maximum width in the range of 1.5 to 5 times the diameter of the individual fiber to be soaked, of the individual thread to be soaked, or of the individual roving to be soaked, and having a maximum length in the range of 2 to 10 times the diameter of the individual fiber to be soaked, of the individual thread to be soaked, or of the individual roving to be soaked.

8. The device as claimed in claim 6, wherein the bearing face (15) on which the individual fiber (5), the individual thread, or the individual roving is guided is an end face of a second porous material (17) which is soaked with matrix material.

9. The device as claimed in claim 1, wherein the sleeve (21) in which the porous material is received is embodied in two parts and can be opened for placing the individual fiber (5), the individual thread, or the individual roving therein, each part of the sleeve containing porous material.

10. The device as claimed in claim 9, additionally comprising a nozzle or a perforated plate for setting a desired fiber content by volume.

11. A method for producing components from impregnated individual fibers (5), individual threads, or individual rovings, comprising the following steps:
(a) impregnating an individual fiber (5), an individual thread, or an individual roving with a matrix material in a device (1) as claimed in claim 1;
(b) laying the soaked individual fibers, individual threads, or individual rovings on to the surface of a molding tool for molding the component; and
(c) curing or solidifying the matrix material and removing the component.

12. The method as claimed in claim 11, wherein the molding tool is a winding mandrel onto which the individual fiber (5), the individual thread, or the individual roving is wound for producing a hollow body.

13. The method as claimed in claim 11, wherein for producing the component a plurality of individual fibers (5), individual threads, or individual rovings which in each case have been impregnated in a device are simultaneously laid onto the surface of the molding tool in order for the component to be formed.

* * * * *